3,508,638
BALE LIFTING MECHANISM FOR ELEVATOR
CHUTE
George Jay and Everett V. Rankins, both of 602 Merle
Lane, Manteca, Calif. 95336
Filed May 23, 1968, Ser. No. 731,553
Int. Cl. B65g 65/06
U.S. Cl. 198—7                                            10 Claims

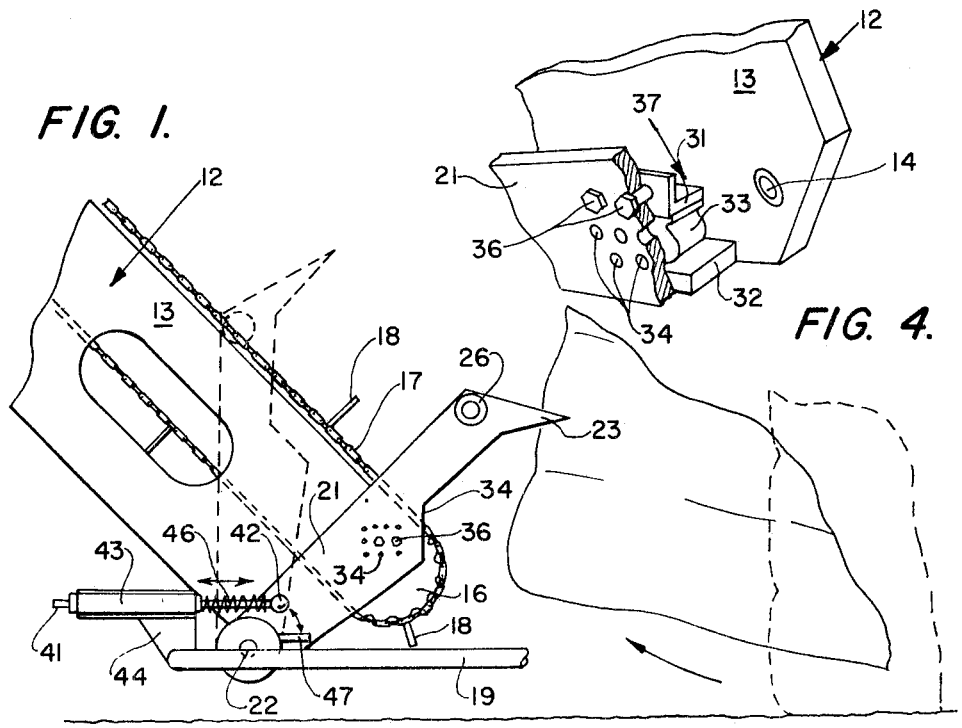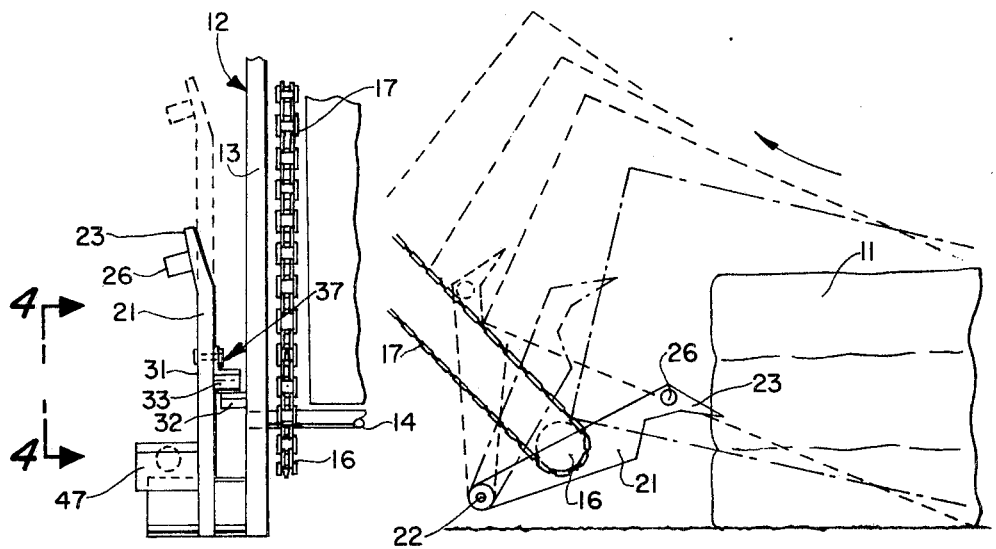
FIG. 1. FIG. 4. FIG. 2. FIG. 3.
INVENTOR.
GEORGE JAY
EVERETT V. RANKINS
BY
ATTORNEY ated Apr. 28, 1970

ABSTRACT OF THE DISCLOSURE

Mobile lifting machines used in lifting hay bales and the like from ground level employ conveyor chains provided with lugs. The linear speed of the chain is frequently less than the speed of advance of the machine; hence the bale is pushed along the ground and possibly damaged. A pair of pivoted, pointed fingers is mounted on the bottom of the conveyor in such manner that they impale the bale, lifting the end nearest the conveyor upward until the bale is deposited upon the conveyor.

---

This invention relates to a new and improved bale lifting mechanism for elevator chutes. At present, various machines are used to lift bales and similar articles from the ground or floor to an elevated position. A common means is an elevator chute which comprises one or more continuous chains having spaced lugs which are mounted on driver and driven sprockets at opposite ends of an upwardly-rearwardly inclined chute structure. A common use for such machines is in lifting hay bales which have been dropped from a baling machine at spaced intervals in a field onto a truck, stacker or other machine. Reference is made to our copending application Ser. No. 569,503 filed Aug. 1, 1966, on a bale stacking apparatus and method for one version of such stacker machine.

Ordinarily, the elevator chute chain is driven at a linear speed which is less than the ground speed of the machine. Accordingly, when the forward end of the chute contacts a bale lying on the ground, the difference in velocity of the lifting chain and of the machine forces the bale to skid over the ground. Skidding may have undesirable results in that it may damage the bale or baling wire, or it may cause difficulty in steering the vehicle. The present invention has for its principal object the provision of means for lifting the nearest end of the bale upwardly, supporting the bale during the lifting movement by its opposite forward edge. The lifted end of the bale is pivoted to a position somewhat upwardly of the forward end of the chute and thus the bale is deposited upon the lower end of the chute. The combination of the lifting movement of the lifting means and the eventual lifting action of the lugs of the chain accomplishes more rapid elevation of the bale in the chute and eliminates the tendency to skid along the ground.

A principle feature of the invention is the fact that the lifting of the bale is accomplished automatically and that no separate drive mechanism is required for the lifting element in that there are pivoted fingers mounted on the chute which pierce the stationary bale. Thus no separate power means is required, nor is the attention of the operator required for operation of the mechanism.

A still further feature of the invention is the provision of adjustment of the initial position of the fingers dependent upon the size bale being handled, the ground condition, the elevator chain speed and other factors which affect satisfactory operation of the device.

A further feature of the invention is the provision of resilient means for stripping the bale from the fingers and for returning the fingers from a retracted position to initial position, where they are available to lift the next bale encountered.

A still further feature of the invention is the provision of means which prevents undue penetration of the bale by the lifting fingers.

Other objects of the present invention will become apparent upon reading the following specification and referring to the accompanying drawings in which similar characters of reference represent corresponding parts in each of the several views.

In the drawings:

FIG. 1 is a side elevational view of a portion of an elevator chute on which the invention is installed, together with a portion of a bale to be lifted.

FIG. 2 is a fragmentary front elevational view of the structure of FIG. 1.

FIG. 3 is a schematic view similar to FIG. 1, showing the sequence of lifting of the bale.

FIG. 4 is an enlarged, fragmentary perspective view of a portion of the mechanism.

The present invention is shown lifting a conventional hay bale 11, which is lying on the ground in a field in the position at which it has been dropped by a hay baler machine. It will be understood that the invention is applicable to lifting objects other than bales.

Shown by way of example is the forward end of the chute 12 attached to a mobile machine which advances through the field. Mounted between side frame members 13 of chute 12 is a shaft 14 supporting an idler sprocket 16 around which passes chain 17, having lifting lugs 18 at spaced intervals. Chain 17 is driven by a driver sprocket (not shown) at the upper end of the chute 12. In a typical installation, the linear speed of chain 17 is about six miles per hour while the machine may be advancing along the ground at a speed of fifteen miles per hour. It will be apparent, therefore, as the bale 11 is received between laterally spaced forwardly projecting guide bars 19 and brought into contact with the bottom of chute 12, that the speed of lugs 18 is substantially less than the speed of the machine and this causes the forward end of the chute 12 to push or skid the bale 11 along the ground until such time as lugs 18 can lift it off the ground and commence upward passage in the chute 12. The present invention has for its principal purpose eliminating the time delay in lifting the bale and thus reducing or eliminating the skidding of the bale along the ground.

A finger 21 is provided pivotally mounted about pivot axis 22 to the lower forward corner of each side frame member plate 13, it being understood that there is a finger on each side of the chute. Since the fingers are similar in construction and mounting, only one is illustrated and described. At the end of finger 21 opposite pivot 22 is a point 23, which is sharpened and generally forwardly tapered and outwardly bent to pierce the adjacent end of bale 11. The position of pivot 22 relative to point 23 is such that when the point 23 pierces the stationary bale 11 it tends to swing in a counter-clockwise direction about pivot axis 22 and since, in its position of rest, the finger 21 is pointed forwardly-upwardly the result is that the point 23 increases in elevation relative to the ground. Since the point 23 impinges upon the bale 11, the bale is also lifted, as is best shown in FIG. 3. As the bale is lifted it tips about the remote bottom corner as a fulcrum, said corner remaining practically stationary rather than sliding over the ground. The adjacent end of the bale, however, is deposited well up above the bottom of chute 12, so that the lugs 18 continuously advance it.

As an additional feature of the invention, an outward projecting ear 26 is formed on finger 21, spaced rearwardly of point 23. Ear 26 prevents undue penetration of point 23 in the bale 11.

The position of the finger 21 relative to the horizontal is of some degree of criticality and said position is dependent upon the relative speed of the chain 17 and the vehicle, the dimensions of the bale 11 and other factors. Because such factors vary under operating conditions, it is desirable that the position of finer 21 be adjustable. For such purpose, on the inside of finger 21 is a top abutment 31 and stationarily mounted on plate 13 is a bottom abutment 32, one of the abutments (here shown as the top abutment 31) being provided with a resilient bumper 33. The stationary abutment 32 provides a limiting stop for the downward movement of finger 21, and such position is adjustable by adjusting the position of top abutment 31. For such purpose a series of spaced holes 34 is formed in finger 21. Bolts 36 fit through selected holes 34 and are threaded into a block 37 welded to the top of abutment 31. By selection of holes 34 the position of abutment 31 may be adjusted, thereby adjusting the initial or downmost position of finger 21.

In order to return the finger 21 to its initial position after it has reached fully retracted position and also to facilitate stripping the bale from the point 23, resilient means is provided. Such resilient means as here shown comprises a rod 41 having a knob 42 on its forward end supported by sleeve 43 mounted by means of bracket 44 on the bottom end of chute 12. Spring 46 is interposed between knob 42 and sleeve 43. Fixed to finger 21 is an extension 47 positioned so that as the finger 21 swings in a counter-clockwise direction the top surface of extension 47 contacts knob 42 and pushes rod 41 to the left, as viewed in FIG. 1, compressing spring 46. Thus the spring 46 enables the finger 21 to retract fully and to permit the chain 17 and particularly the lugs 18 to lift the bale up the chute 12 without further interference by finger 21. However, as soon as the bale 11 has passed above the position of finger 21, spring 46 restores the finger to its initial or solid line position shown in FIG. 1, where it is available to pierce the next bale encountered by the machine.

In operation, the vehicle on which the chute 12 is mounted is driven through the field at a sufficient speed to satisfy loading requirements. The operator steers the machine so that each bale 11 as it is encountered is received between the guides 19 and guided back toward the bottom of chute 12. Just before the bale encounters the bottom of the chute, the points 23 pierce the bale near the top of its nearmost end. Since the bale 11 is stationary while the chute 12 is moving forwardly, the fingers 21 swing in a counter-clockwise direction, being restrained from clockwise movement by contact of abutments 31 and 32. As the fingers swing and the machine advances, the bale tilts, as has been explained and as best shown in FIG. 3, until the bottom of the bale is deposited on top of the lower end of chute 12 and the lugs 18 begin lifting the same. Extensions 47 have meanwhile encountered knobs 42 and retracted rods 41, compressing springs 46. As soon as the bale clears up the chute beyond fingers 21, spring 46 restores fingers 21 to initial position. Adjustment of the position of the fingers may be accomplished from time-to-time as operating conditions require by selection of different holes 34 for the mounting of top abutment 31.

What is claimed is:

1. An article lifting mechanism comprising a chute, means for advancing said chute along a surface, said chute having a frame and conveyor means in said frame for lifting an article up said chute, a finger having a point to impale an article resting on said surface and means pivotally mounting said finger on said frame for oscillatory motion behind and below said conveyor, said finger being mechanically discrete from said conveyor, whereby advancement of said chute causes said point to impale said article and then causes said finger to pivot to lift said article upward as said chute advances toward said article to lift said article onto said conveyor.

2. A mechanism according to claim 1 which further comprises means on said finger limiting depth of penetration of said point into said article.

3. A mechanism according to claim 1 in which said point is bent outwardly and directed downwardly relative to said finger.

4. A mechanism according to claim 1 which further comprises cooperating stop means on said finger and said frame limiting pivotal movement of said finger in a forward direction.

5. A mechanism according to claim 4 in which at least one said stop means is adjustable in position to adjust the position of rest of said fingers.

6. A mechanism according to claim 4 which further comprises resilient means interposed between and carried by one of said stop means.

7. A mechanism according to claim 1 in which said conveyor means comprises a chain, a sprocket and a shaft on which said sprocket is mounted, said shaft extending horizontally transversely of said frame, said means pivotally mounting said finger having an axis parallel to, below and behind said shaft.

8. A mechanism according to claim 7 in which said chain has a plurality of spaced lugs.

9. A mechanism according to claim 1 which further comprises cooperating resilient finger restoring means on said finger and said frame, said restoring means retracting to permit upward-rearward movement of said finger as said article is lifted onto said chute, said restoring means projecting to restore said finger to forward position when said article has moved up said chute.

10. A mechanism according to claim 9 in which one said restoring means comprises a rod, means slidably mounting said rod, and spring means biasing said rod toward the other of said restoring means, said other restoring means positioned to engage an end of said rod as said finger pivots and stress said spring means.

References Cited

UNITED STATES PATENTS

| | | |
|---|---|---|
| 2,402,465 | 6/1946 | Templeton. |
| 2,418,726 | 4/1947 | Rogers _____ 214—91 X |
| 2,550,976 | 5/1951 | Cushman _____ 198—178 X |
| 3,127,973 | 4/1964 | Scott _____ 198—7 |

ALBERT J. MAKAY, Primary Examiner

U.S. Cl. X.R.

198—178; 214—522